US006791959B1

(12) United States Patent
Palmer et al.

(10) Patent No.: US 6,791,959 B1
(45) Date of Patent: Sep. 14, 2004

(54) METHOD FOR DETERMINING WHEN A COMMUNICATION DEVICE SHOULD RATE SHIFT OR ROAM IN A WIRELESS ENVIRONMENT

(75) Inventors: Brian G. Palmer, Redmond, WA (US); Alan F. Jovanovich, Des Moines, WA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 09/342,315

(22) Filed: Jun. 29, 1999

Related U.S. Application Data

(63) Continuation-in-part of application No. 09/291,581, filed on Apr. 12, 1999.

(51) Int. Cl.⁷ .............................................. H04Q 7/00
(52) U.S. Cl. ..................... 370/332; 370/328; 370/329; 370/331; 370/335; 370/342; 455/423; 455/424; 455/63.1; 455/436
(58) Field of Search ................................. 370/328, 329, 370/335, 331, 332, 342; 455/423, 424, 425, 63, 456, 67.1, 435–436, 437–439, 440

(56) References Cited

U.S. PATENT DOCUMENTS

| | | | | |
|---|---|---|---|---|
| 5,235,633 A | * | 8/1993 | Dennison et al. | 342/357.1 |
| 5,301,356 A | * | 4/1994 | Bodin et al. | 455/436 |
| 5,371,738 A | | 12/1994 | Moelard et al. | |
| 5,408,683 A | * | 4/1995 | Ablay et al. | 455/433 |
| 5,448,569 A | | 9/1995 | Huang et al. | |
| 5,448,754 A | * | 9/1995 | Ho et al. | 455/454 |
| 5,551,058 A | * | 8/1996 | Hutcheson et al. | 455/429 |
| 5,603,093 A | * | 2/1997 | Yoshimi et al. | 455/63 |
| 5,633,888 A | | 5/1997 | Stewart | |
| 5,815,814 A | * | 9/1998 | Dennison et al. | 342/450 |
| 5,857,155 A | * | 1/1999 | Hill et al. | 342/357.1 |
| 5,946,611 A | * | 8/1999 | Dennison et al. | 455/404 |
| 6,002,936 A | * | 12/1999 | Roel-Ng et al. | 455/456 |
| 6,026,304 A | * | 2/2000 | Hilsenrath et al. | 455/456 |
| 6,038,444 A | * | 3/2000 | Schipper et al. | 455/421 |
| 6,049,715 A | * | 4/2000 | Willhoff et al. | 455/436 |
| 6,061,337 A | * | 5/2000 | Light et al. | 370/331 |
| 6,185,205 B1 | * | 2/2001 | Sharrit et al. | 370/389 |
| 6,216,004 B1 | * | 4/2001 | Tiedemann et al. | 455/442 |
| 6,253,082 B1 | * | 6/2001 | Hengeveld | 455/436 |
| 6,282,426 B1 | * | 8/2001 | Wang | 342/450 |
| 6,321,090 B1 | * | 11/2001 | Soliman | 370/331 |
| 6,324,404 B1 | * | 11/2001 | Dennison et al. | 455/406 |
| 6,327,471 B1 | * | 12/2001 | Song | 455/12.1 |
| 6,385,454 B1 | * | 5/2002 | Bahl et al. | 455/440 |
| 6,393,281 B1 | * | 5/2002 | Capone et al. | 455/428 |
| 6,438,386 B2 | * | 8/2002 | Joshi et al. | 455/515 |
| 6,552,661 B1 | * | 4/2003 | Lastinger et al. | 340/572.1 |
| 6,556,553 B1 | * | 4/2003 | Palmer et al. | 370/333 |
| 6,611,688 B1 | * | 8/2003 | Raith | 340/992 |
| 6,631,263 B1 | * | 10/2003 | Corkery | 455/436 |
| 2001/0003443 A1 | * | 6/2001 | Velazquez et al. | 342/367 |

FOREIGN PATENT DOCUMENTS

EP     0 818 938    1/1998

* cited by examiner

*Primary Examiner*—William Trost
*Assistant Examiner*—Marcos Torres
(74) *Attorney, Agent, or Firm*—McAndrews, Held & Malloy, Ltd.

(57) ABSTRACT

Methods for improving communication performance in a wireless communication system where the wireless communication system has at least one mobile wireless communication device and a plurality of transmitter/receiver sites. The transmitter/receiver sites have a geographic area, defined as a cell, within which the mobile wireless wireless communication devices can communicate with at least one of the transmitter/receiver sites. The methods determine when the mobile wireless communication device should rate shift or roam based on connection quality measurement data or position information such as GPS.

16 Claims, 5 Drawing Sheets

METHOD FOR DETERMINING WHEN A COMMUNICATION DEVICE SHOULD RATE SHIFT OR ROAM IN A WIRELESS ENVIRONMENT

RELATED APPLICATION

This application is a continuation-in-part of co-pending application Ser. No. 09/291,581, filed Apr. 12, 1999.

BACKGROUND OF THE INVENTION

1. Field of the Invention

The present invention relates to wireless communication systems, and more particularly, to a method for determining when a wireless communication device should rate shift or roam in order to improve communication performance.

2. Description of Related Art

The ability to communicate with people on the move has evolved considerably since Guglielmo Marconi in 1897 first demonstrated radio's ability to provide continuous contact with ships sailing the English Channel. Since then new wireless communications methods, including mobile radio communications, have grown by orders of magnitude, fueled by electronic miniaturization technologies and the large-scale deployment of affordable, easy-to-use, radio communication networks.

Examples of a radio communication network are a wireless local area network (WLAN) and a wireless wide area network (WWAN). A WLAN comprises a plurality of wireless communication devices that communicate using radio frequency (RF) signals. As in a wired local area network (LAN), the WLAN allows users to seamlessly access disk drives, printers, and additional computer resources and systems connected to the WLAN. The wireless communication devices include a radio receiver/transmitter adapted for RF communication with the other elements of the WLAN. The WLAN may also include a central host processing unit that sends information to and receives information from any one of the plurality of remotely disposed communication devices. The WWAN expands upon the features of the WLAN and offers extended geographic coverage for the communication network that may include a state or even countries.

The central host processor may also form part of a separate wired LAN to provide a bridge with the WLAN. In such a WLAN, the wireless communication devices may comprise portable units that operate within a defined environment to report information back to the central host processing unit. In general, the defined wireless environment may be further divided into basic service areas or cells that are supported by transmitter/receivers of the WLAN for providing segmented but complete wireless coverage for the wireless communication devices over the defined area. The WWAN may incorporate these features of the WLAN or may be a completely wireless network. Thus, WLAN and WWAN systems offer increased flexibility over wired LAN systems by enabling operators of the wireless communication devices substantial freedom of movement through the environment, and are particularly useful for remote communication and data collection applications such as inventory control, manufacturing and production flow management, and asset tracking.

For example, in a WLAN or WWAN, a mobile worker may move throughout the work area carrying a wireless communication device such as a portable terminal or computer. The work area may be within a building or from one building to another and the mobile worker may move from one cell to another. The wireless device must maintain a wireless connection that is transparently maintained so that the central host processing unit and the mobile worker can perform their assigned tasks. As the worker travels within a cell or from one cell to another, it may become necessary for the wireless communication device to lower the transmission rate in order to maintain the connection to the transmitter/receiver of the current cell. Alternatively, the wireless communication device may switch (also known as roam) from the current cell to another cell that may offer better connection quality to the communication network. In either case, the wireless communication device must make this transition without a loss of connection or service degradation being noticed by the mobile worker or the central host processing unit. The transition should be seamless and appear and operate as a wired connection.

In a typical WLAN or WWAN, the wireless communication device determines whether to rate shift or roam based on (1) the failure to successfully transmit and/or (2) comparison of the connection quality between one or more cells with respect to (i) an acceptable predefined threshold or (ii) connection quality. These methods for rate shifting or roaming are relatively inflexible. For example, they cannot be easily modified through configuration parameters or dynamically based on the wireless environment. Furthermore, these methods also react to the state of the wireless connection rather than anticipate the state. By reacting to the state of a connection, the decision to rate shift or roam occurs at the moment when the wireless communication device is ready to transmit. This results in slower response times as conditions change. The wireless network performance suffers and utilization difficulties arise such as delays in transmission, necessary retransmissions, loss of data, or unintelligible voice connections. Finally, there may be a complete connection loss between the wireless communication device and the central host processing unit.

Under some current implementations, delays in rate shifting and/or roaming within a cell or to a new cell may result in the loss of data, voice, or a network connection, such as a TCP/IP network connection, between the wireless communication device and the central host processing unit. When a data or network connection is lost, the worker must reinitiate a logon sequence to the host, then to the required application, and finally repeat the work that was lost. Similarly, when a voice connection is lost, the worker must reestablish the connection, determine at what point in the conversation did the connection fail, and then repeat the conversation for at least the portion that was lost. If the mobile worker is in a location situated at a cell boundary or at the boundary of several cells, the wireless communication device may be unable to effectively maintain a connection due to interference or marginal signal quality. The worker then would be unable to perform the assigned tasks because of the communication connection failure.

This situation can be further aggravated by changing conditions within a cell or among cells of the wireless environment. For example, inventory moved around within a warehouse or workspaces that are reconfigured can affect communication performance, including cell coverage, and place increased demands upon the rate shift and roam functions.

Accordingly, it would be desirable to provide a method for determining when a communication device should rate shift or roam in a wireless environment. The method would improve communication connections and performance by reducing the number of required retransmissions, offer an optimum bandwidth, and faster response time. The method would further reduce network connection losses due to the use of industry standard network protocols by the wireless media. Furthermore, the method would be flexible and anticipate the rate shift and roam requirements, even as the communication environment evolves.

SUMMARY OF THE INVENTION

The invention is useful in a method of improving communication performance in a wireless communication system having at least one mobile wireless communication device and a plurality of transmitter/receiver sites that communicate with communication signals, each of which has a geographic area, defined as a cell, within which the at least one mobile wireless communication device can communicate with at least one of the transmitter/receiver sites. In such an environment, according to a first method embodiment of the invention, communication performance is improved by receiving at one of the transmitter/receiver sites the communication signals transmitted by the communication device, and evaluating over time intervals the quality of the communication signals received from the mobile wireless communication device to obtain measurement values of the quality of the evaluated communication signals. A functional relationship value based on the measurement values and a configurable parameter associated with the measurement values are created. The functional relationship value is stored in a memory. An extrapolated functional relationship value based on a stored functional relationship value is calculated, and an optimal one of the plurality of transmitter/receiver sites for communication with the wireless communication device based on the extrapolated functional relationship value is determined.

According to a second method embodiment of the invention, communication performance is improved by receiving at one of the transmitter/receiver sites the communication signals transmitted by the communication device, and evaluating over time intervals the quality of the communication signals received from the mobile wireless communication device to obtain measurement values of the quality of the evaluated communication signals. One of a transmission failure and reception failure of the communication signals is detected. The last measurement value evaluated before the detected one of a transmission failure and a reception failure is stored. A function based on current values of the measurement values and the stored last measurement value is calculated, and whether to make a change in the transmission of the communication signals based at least in part on the function is determined.

DETAILED DESCRIPTION OF THE PREFERRED EMBODIMENT

Figure 1:
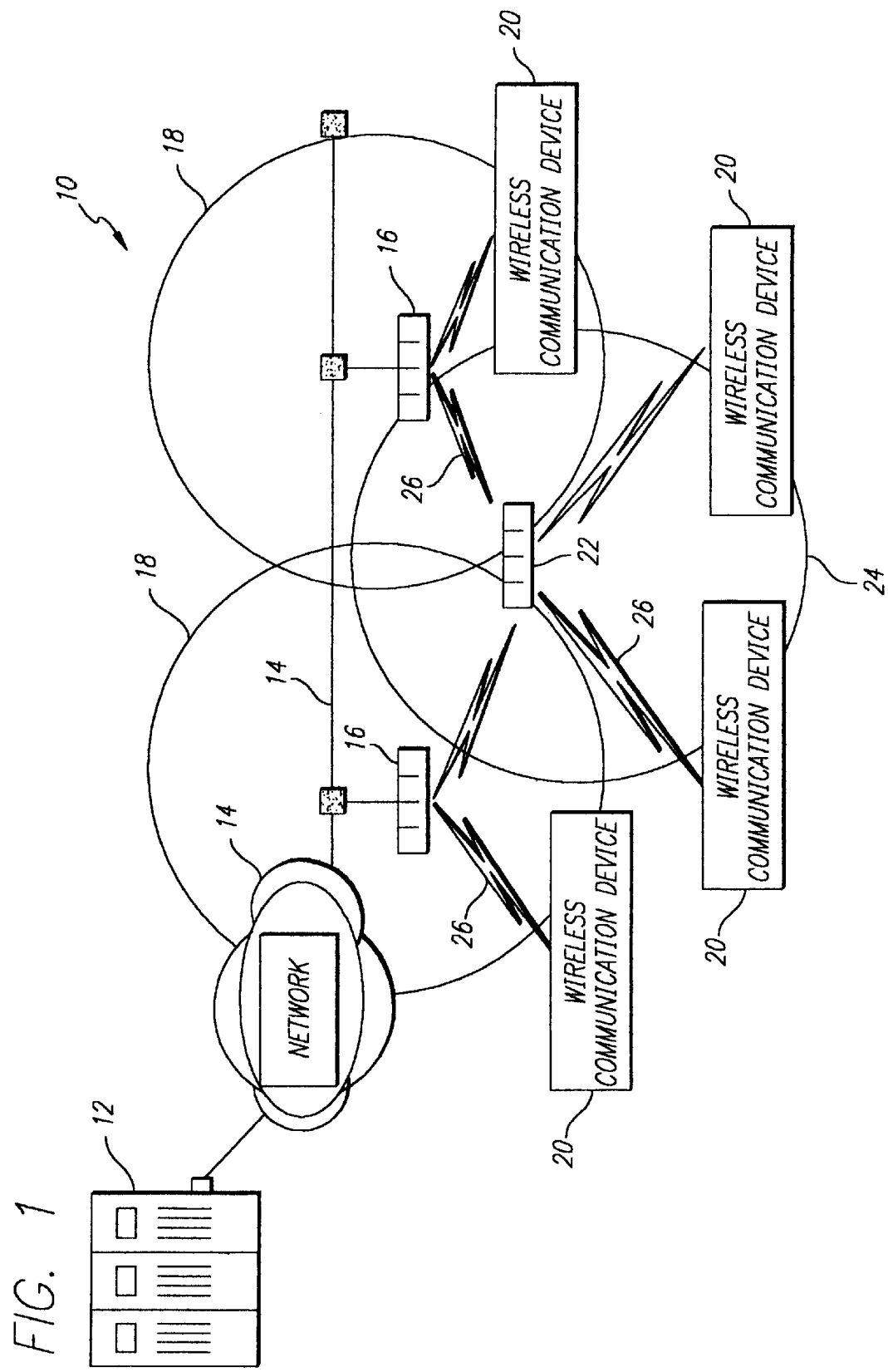
FIG. 1 is a system diagram illustrating a communication system within a facility.

The present invention satisfies the need for a method for determining when a communication device should rate shift or roam in a wireless environment that improves communications performance. The method would be flexible, robust, and anticipate the rate shift and roam requirements. Communication performance would improve due to the reduced retransmission requirements, faster response time, optimum bandwidth, and fewer connection dropouts. Network connection losses would be significantly reduced and the method would dynamically adjust to the evolving wireless communication environment. In the detailed description that follows, it should be appreciated that like reference numerals are used to identify like elements illustrated in one or more of the figures.

Referring first to FIG. 1, a communication system 10 is illustrated. The communication system 10 includes a central host processor 12 connected to a wired network 14. The central host processor 12 may, for example, consist of a UNIX based system that defines the host or application environment for the wired network 14. The wired network 14 media may, for example, consist of an Ethernet, Token Ring, or ATM, and utilize network protocols such as TCP/IP, SPX/IPX, SNA LU6.2, as known in the art. The wired network 14 has a plurality of access points 16 that are coupled to the wired network 14. The plurality of access points 16 are transmitter/receivers that define basic wireless service areas called cells 18 within which a wireless communication device 20 is in range to communicate with the respective access point 16 for the given cell 18. The radio frequency (RF) wireless links are represented symbolically by RF links 26. The access point 16 acts as a bridge from the wireless communication arena defined by its cell 18 to the wired network 14. There may also be one or more wireless access points 22 that are wireless transmitter/receiver repeaters that define cells 24. The wireless access points 22 can be used to extend the wireless coverage of the access points 16 and, in general, the communication system 10, by relaying information to and from the wireless communication devices 20 and the access points 16. There may also be multiple links from one wireless access point 22 to another until finally reaching the access point 16.

Figure 2:
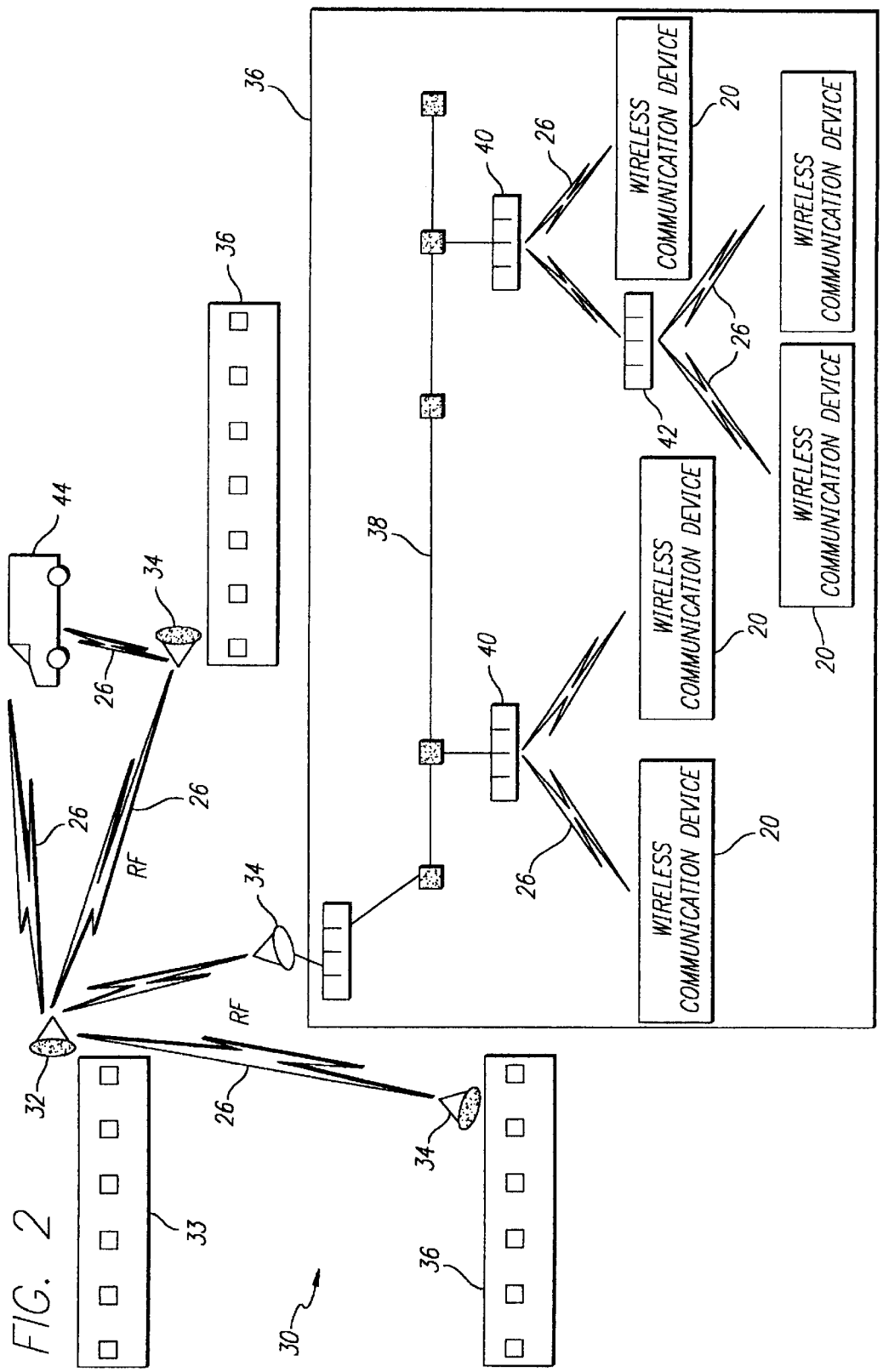
FIG. 2 is a system diagram illustrating a communication system that includes multiple facilities.

FIG. 2 illustrates a communication system 30. The communication system 30 expands upon the features of the communication system 10 of FIG. 1 by providing wireless coverage not only within a building, but also among several buildings or even within a city. The communication system 30 includes a central antenna 32 that communicates through RF links 26 to a plurality of remote antennas 34. The central antenna 32 may be attached to an administration building 33 or other central location based upon the location of the remote antennas 34. The remote antennas 34 may be located on various buildings 36 or other convenient remote locations. The building 36 may include a wired network 38 with a plurality of access points 40. Each access point 40, as in FIG. 1, would consist of a transmitter/receiver defining a cell 18 that provides RF coverage for the wireless communication devices 20. The access point 40 would provide a bridge for the wireless communication devices 20 to the wired network 38. There may also be wireless access points 42 that consist of transmitter/receiver repeaters, as in FIG. 1. The wired network 38 is then linked to the administration building 33 and its associated network through the remote antenna 34 to the central antenna 32 and finally through its link to a wired network (not shown) within the administration building 33.

In FIG. 1, as the mobile worker, with the wireless communication device 20, moves throughout the work area, it is necessary to maintain the wireless connection between the wireless communication device 20 and the wired network 34 and ultimately to the central host processor 12. The wireless communication device 20 may transition between one cell 18 to another or between the cell 18 and the cell 24 covered by the wireless access point 22. In FIG. 2, the wireless communication device 20 may also transition between buildings or comprise part of a wireless wide area network. The wireless communication device 20 may be within a vehicle 44 that communicates through the remote antennas 34 or directly with the central antenna 32, depending upon the communication system 30 structure and the proximity of the vehicle 44 to the various cells of the system. Thus, the communication system utilized could be a completely wireless network with the wireless communication device 20 communicating through a number of antennas that are in communication with each other via wireless methods and provide coverage over a wide geographic area.

For the examples discussed above, the wireless communications can consist of voice or data information, as known in the art. The wireless connection should be transparent to the mobile worker as the wireless communication device 20 roams from cell to cell or rate shifts. There should be no loss of connection or service degradation and it should appear as if there is a wired connection. If the RF connection begins to degrade, a determination should be made as to whether communication performance would improve by transmitting at a lower information rate or roaming to another cell offering a higher quality RF connection. This determination could be made by the wireless communication device 20 having a processor and a memory, with the processor executing a stored program for carrying out the method steps discussed below. Alternatively, the method steps may be performed centrally, for example, by the network or a central host processor.

Figure 3:
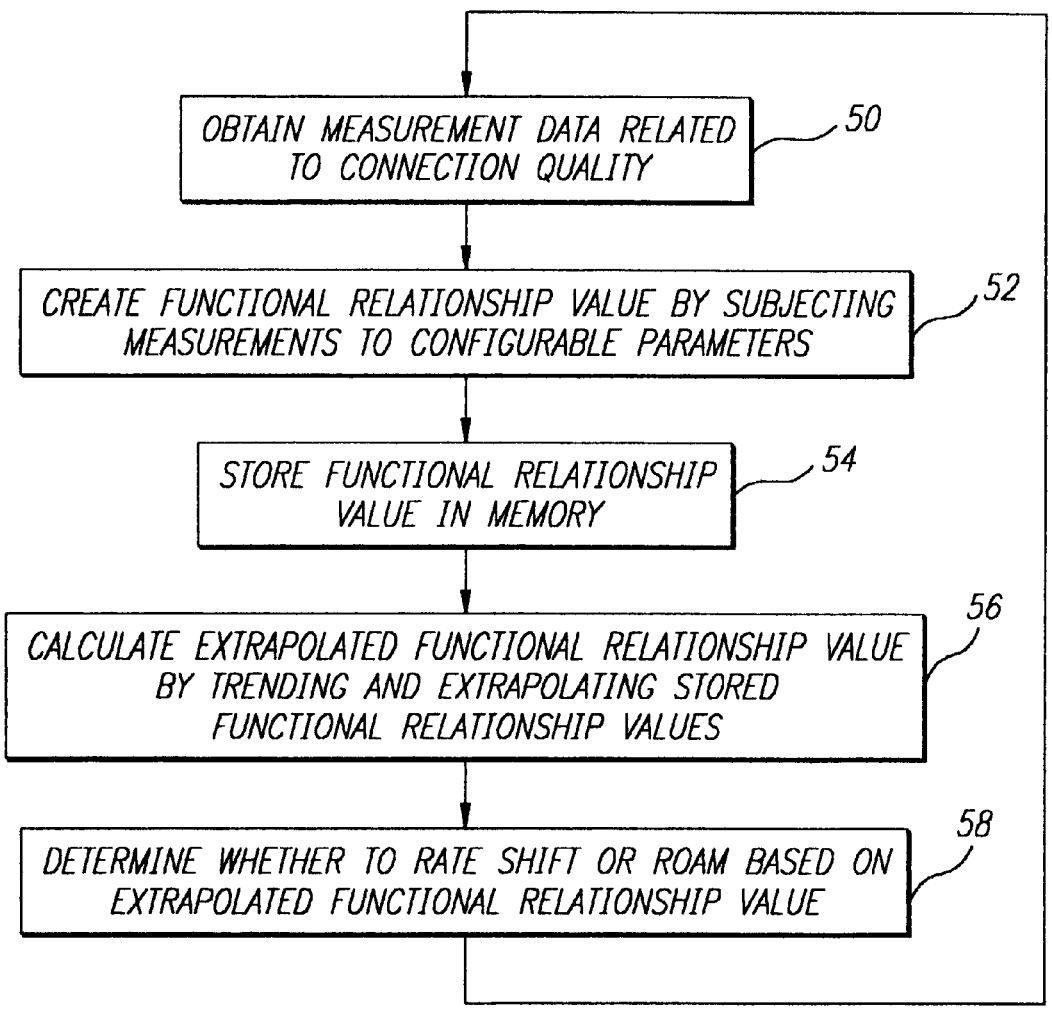
FIG. 3 is a flowchart diagram illustrating a predictive method for determining when a communication device should rate shift or roam in a wireless environment in accordance with an embodiment of the present invention.

In accordance with a first embodiment of the present invention, a predictive method for determining when a communication device should rate shift or roam in a wireless environment is provided. FIG. 3 illustrates the basic steps, in flowchart form, of the predictive method. The method would utilize various measurements to evaluate connection quality, the measurement data obtained at step 50. These measurements may include but are not limited to: 1) signal-to-noise ratio (SNR); 2) bit error rate (BER); 3) number of transmission retries (NTR); 4) received signal strength indicator (RSSI); 5) bit energy-to-noise density ($E_b/N_0$); 6) global position information (GPS); and 7) cell congestion information (also known as load factor). These measurements ($m_j$) would be utilized in conjunction with configurable parameters that controls the use of $m_j$ such as: 1) utilization of a measurement ($u_j$) (e.g., yes/no); 2) how measurement is used ($h_j$) (e.g., weighting factor); and 3) related measurement decision criteria ($d_j$) (e.g., threshold). At step 52, the measurements, subjected to the configurable parameters, create a functional relationship $f_j(m_j, u_j, h_j, d_j)$. The functional relationship value is stored in memory at step 54. At step 56, the value of function $f_j$ in conjunction with measurements taken at prior time intervals $t_1, t_2, \ldots, t_n$ with respective values of function $f_{j-1}, f_{j-2}, \ldots, f_{j-n}$ are trended and extrapolated to yield extrapolated value $f_{j+1}$. The extrapolated value, $f_{j+1}$, is then used to determine, at step 58, whether to rate shift or roam prior to the next transmission.

Thus, this method evaluates the most recent measurements sampled and extrapolates future measurements based on the data trend. This allows anticipation of the need to rate shift or roam rather than to wait for an unsuccessful transmission or comparison against a fixed predefined threshold. The prediction of future measurements can even be performed while the last transmission is taking place. Thus, a proactive approach for rate shifting and roaming is adopted that can be critical when the mobile worker is moving swiftly on a motorized vehicle or when using high speed data and voice transmission rates.

In accordance with a second embodiment of the present invention, a heuristic method for determining when a communication device should rate shift or roam in a wireless environment is provided. This method initially only rate shifts or roams based on a failure to transmit or receive. The values of measurement parameters that are being used to characterize the quality of a connection on every transmission or reception are recorded. When a failure occurs, the previous measurements taken are stored in a data vector. There is one data vector for each rate shift and one for roaming. The values in each data vector are then utilized to establish the criteria to rate shift or roam.

Figure 4:
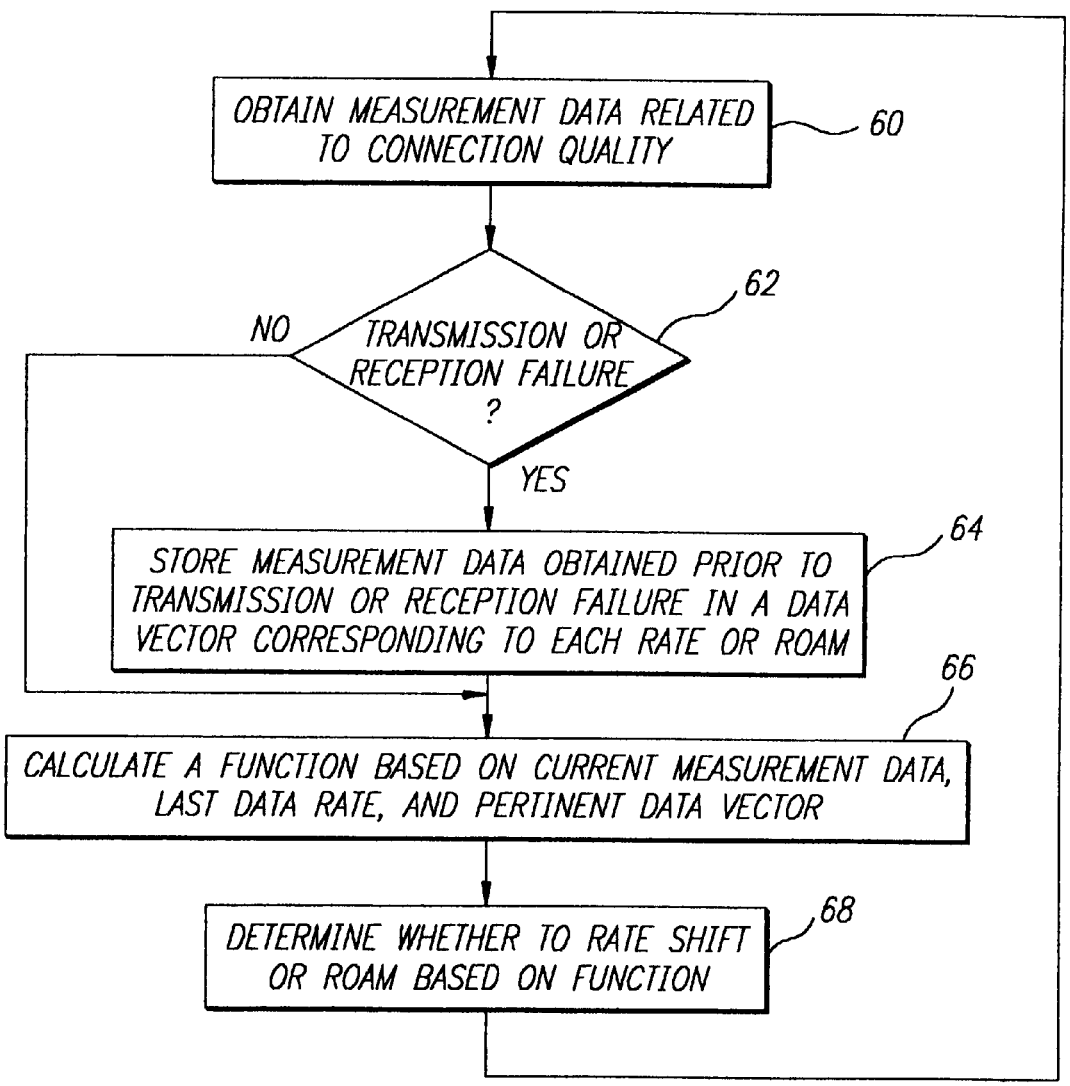
FIG. 4 is a flowchart diagram illustrating a heuristic method for determining when a communication device should rate shift or roam in a wireless environment in accordance with an embodiment of the present invention.

FIG. 4 illustrates the basic steps, in flowchart form, of the heuristic method. This method would utilize various measurements, taken at step 60, to evaluate connection quality. These measurements may include but are not limited to: 1) signal-to-noise ratio (SNR); 2) bit error rate (BER); 3) number of transmission retries (NTR); 4) received signal strength indicator (RSSI); 5) bit energy-to-noise density ($E_b/N_0$); 6) global position information (GPS); and 7) cell congestion information. These measurements ($m_j$) would be utilized in conjunction with historical data vectors ($r_j$) that represent when a rate shift or roam should occur. The historical data vectors store the measurements taken prior to a transmission or reception failure for each rate shift and one for roam, as shown at steps 62 and 64. The current measurements $m_j$, last data rate $L_j$, and pertinent vector $r_j$ are then used to determine whether to rate shift or roam based on a function $f(m_j, L_j, r_j)$, as shown at steps 66 and 68. The function f can be a very simplistic function that performs a compare operation against the vector values $r_j$ or it can be a more sophisticated function such as taking the median, highest, or lowest value of $r_j$.

Thus, the heuristic method dynamically calculates the rate shift and roam criteria based on a given wireless environment. If the wireless environment changes, the decision criteria will evolve and be automatically updated to reflect the current wireless environment. With each transmission or reception, the measurements are compared to the rate shift and roaming criteria and the appropriate action is taken. The vector updates and criteria updates occur after the last transmission or reception and prior to the next. In this fashion, the criteria are always optimal. The result is a rate shift and roaming algorithm that is tailored to a customer's environment and that dynamically adjusts to changes in the wireless environment.

In accordance with a third embodiment of the present invention, a global positioning system (GPS) method for determining when a communication device should rate shift, switch channels, or roam in a wireless environment is provided. As known in the art, GPS is a system of satellites that provide signals for a receiver to utilize to allow it to pinpoint its location on earth with precision. In referring to GPS, it may also include differential GPS that can correct for certain errors in positioning information at a location such as by providing additional reference measurements taken at a known location. The GPS method dynamically determines the criteria used to rate shift or roam by utilizing GPS information for the wireless communication device 20 and for the access points or cells in close proximity to the position of the wireless communication device 20. As discussed further below, it is possible to rate shift, switch channels, or roam to a different cell based on the position of the wireless communication device 20 relative to various cells rather than relying on signal strength or degradation.

Figure 5:
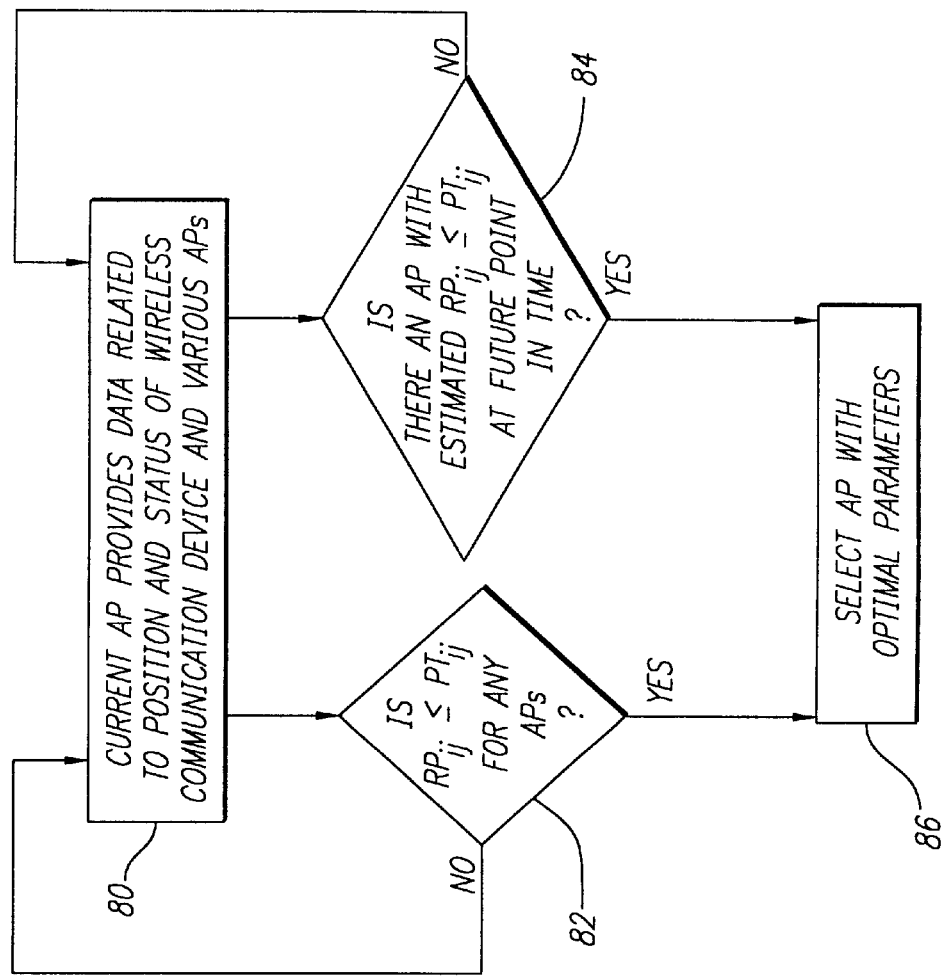
FIG. 5 is a flowchart diagram illustrating a GPS method for determining when a communication device should rate shift or roam in a wireless environment in accordance with an embodiment of the present invention.

The GPS method, illustrated in FIG. 5 in flowchart form, utilizes positioning information such as a table organized in terms of position or vector coordinates of current and adjacent access points and their respective channels and status information to allow a wireless communication device 20 to make an optimal access point selection. The table is provided by the access point (AP) to which the wireless communication device 20 is initially connected, as shown at step 80. Specifically, the table will contain the following information about the wireless communication device 20, the currently connected access point, and the access points adjacent to the connected access point: 1) GPS or Differential GPS position ($G_i$) of the wireless communication device 20; 2) relative position ($RP_{ij}$) of the wireless communication device 20 to various access points; 3) proximity threshold ($PT_{ij}$) for access points; 4) available channel ($C_{ij}$) for access points; and 5) status information ($S_{ij}$) for access points, where $i$ is a time $t_i$ and $j$ is the $j$th cell or access point. The proximity threshold ($PT_{ij}$) provides the maximum range of the cell or the communication envelope that the wireless communication device 20 must be within to be permitted to switch to that corresponding access point. As the wireless communication device transitions from one access point to another, the table is updated. The current access point can estimate the location of the wireless communication device 20 or alternatively, the wireless communication device 20 may obtain a GPS reading and supply this information to the current access point, which can then update the table and also apply differential GPS to refine the location measurement.

A determination is made at step 82 as to whether the relative position $RP_{ij}$ is less than or equal to the corresponding proximity threshold $PT_{ij}$ for each access point with respect to the wireless communication device 20. Alternatively or in addition, through the use of a direction vector consisting of $RP_{ij}$, $RP_{i+1,j}$, etc., it is possible to estimate the next $RP_{ij}$ value at some point in the future and formulate a prediction as to whether to switch the rate, channel, or access point, as shown at step 84. In this way, it is possible to anticipate the need to rate shift or roam prior to an unsuccessful transmission or prior to a comparison against a fixed predefined threshold ($PT_{ij}$) and this prediction of future measurements can be performed while the last transmission is taking place. This proactive approach to rate shifting and roaming may be even more critical when the wireless communication device 20 is rapidly transitioning from one cell to the next or utilizing high speed, efficient wireless communications that are being introduced or will be in the near future. Whether step 82 or step 84 controls may depend upon a weighting function as to which provides the optimal solution based upon the varying conditions. If at least one access point meets either or both criteria of step 82 or 84, then at step 86 the wireless communication device 20 may roam to the access point that offers the optimal conditions such as rate, channel $C_{ij}$, and status information $S_{ij}$ and that is superior to the current access point.

The access point $S_{ij}$ may be utilized to assist in selecting the optimal access point based on accessibility and congestion level, because each access point $S_{ij}$ will have a congestion level associated with it that reflects its availability to accept additional traffic. For example, integer values could be assigned to represent the congestion level (e.g., 1-at capacity, 2–80% utilized, 3–60% utilized, 4–40% utilized, and 5-less than 20% utilized). Based on the status value of the access points $S_{ij}$, the roaming may occur to one of the less congested alternative access points, assuming there is overlap of the cells at the location of the wireless communication device 20.

It should be understood that the inventive concepts described should not be limited narrowly and that alternative embodiments may be made within the scope of the present invention. For example, the wireless communication device 20 is determining the optimal access point based on information supplied by the current access point or cell. However, it should be clear that the communication system including the current cell may evaluate the data and determine the optimal cell for the wireless communication device 20 to communicate with and further, command the wireless communication device 20 to communicate through that optimal cell. Also, although GPS is utilized to determine location and relative positions, alternative techniques as known in the art may be utilized to provide position and relative position information.

The placement of access points may be determined by coverage or by capacity. In a high density area, generally capacity will determine placement. In a low density area, desired maximum coverage will generally determine placement. By linking congestion level with proximity, it is possible to provide load balancing across access points. An additional benefit of the GPS approach relates to 911 emergency service, which currently operates by having a mobile phone connect to an access point and then to a specific 911 service area that the access point serves. Current systems do not use relative proximity, therefore it is possible for a wireless connection to be made to an access point that then connects to the wrong 911 service area for the location of the wireless communication device. This may cause confusion and critical delays in servicing a 911 call, because it delays dispatching of the appropriate emergency service from the closest location or results in additional transferring among agencies until the correct agency for the location is contacted.

Having thus described preferred embodiments of methods for determining when a communication device should rate shift or roam in a wireless environment, it should be apparent to those skilled in the art that certain advantages of the within system have been achieved. It should also be appreciated that various modifications, adaptations, and alternative embodiments thereof may be made within the scope and spirit of the present invention. For example, a wireless environment along with a wired LAN has been illustrated to show an embodiment of the present invention, but it should be apparent that the inventive concepts described above would be equally applicable to a wireless network or wireless communication system, as known in the art. Furthermore, the wireless communication system could comprise any type of wireless RF communication system and include voice and data communications, as known in the art. The invention is further defined by the following claims.

What is claimed is:

1. A method of improving communication performance in a wireless communication system, said wireless communication system having at least one mobile wireless communication device and a plurality of transmitter/receiver sites that communicate with communication signals, each of which has a geographic area, defined as a cell, within which said at least one mobile wireless communication device can communicate with at least one of said transmitter/receiver sites, said method of improving communication performance comprising the steps off:

receiving at one of the transmitter/receiver sites the communication signals transmitted by the communication device;

evaluating over time intervals the quality of the communication signals received from the mobile wireless communication device to obtain measurement values of the quality of the evaluated communication signals;

creating a functional relationship value based on the measurement values and a configurable parameter associated with the measurement values;

storing the functional relationship value in a memory;

calculating an extrapolated functional relationship value based on a stored functional relationship value; and determining an optimal one of said plurality of transmitter/receiver sites for communication with said wireless communication device based on the extrapolated functional relationship value.

2. The method of claim 1, wherein the measurement values comprise signal-to-noise ratios.

3. The method of claim 1, wherein the measurement values comprise bit error rates.

4. The method of claim 1, wherein the measurement values comprise numbers of transmission retries.

5. The method of claim 1, wherein the measurement values comprise received signal strength indicators.

6. The method of claim 1, wherein the measurement values comprise bit energy-to-noise densities.

7. The method of claim 1, wherein the measurement values comprise cell congestion measurements.

8. The method of claim 1, wherein the step of creating the functional relationship value based on the measurement values and the configurable parameter associated with the measurement values, further comprises the steps of:

determining whether to use the measurement values;

applying a weighting factor associated with the measurement values; and applying a threshold factor associated with the measurement values.

9. A method of improving communication performance in a wireless communication system, said wireless communication system having at least one mobile wireless communication device and a plurality of transmitter/receiver sites that communicate with communication signals, each of which has a geographic area, defined as a cell, within which said at least one mobile wireless communication device can communicate with at least one of said transmitter/receiver sites, said method of improving communication performance comprising the steps of:

receiving at one of the transmitter/receiver sites the communication signals transmitted by the communication device;

evaluating over time intervals the quality of the communication signals received from the mobile wireless communication device to obtain measurement values of the quality of the evaluated communication signals;

detecting one of a transmission failure and reception failure of the communication signals;

storing the last measurement value evaluated before the detected one of a transmission failure and a reception failure;

calculating a function based on current values of the measurement values and the stored last measurement value; and determining whether to make a change in the transmission of the communication signals based at least in part on the function.

10. The method of claim 9, wherein the measurement values comprise signal-to-noise ratios.

11. The method of claim 9, wherein the measurement values comprise bit error rates.

12. The method of claim 9, wherein the measurement values comprise numbers of transmission retries.

13. The method of claim 9, wherein the measurement values comprise received signal strength indicators.

14. The method of claim 9, wherein the measurement values comprise bit energy-to-noise densities.

15. The method of claim 9, wherein the measurement values comprise cell congestion measurements.

16. The method of claim 9, wherein the mobile wireless communication device and the plurality of transmitter/receiver sites communicate at a variable data rate, wherein the device roams from one site to another and wherein the determining whether to make a change comprises one of determining that the device will roam and determining that the data rate will be shifted.

\* \* \* \* \*